United States Patent [19]

Leo

[11] Patent Number: 4,520,065
[45] Date of Patent: May 28, 1985

[54] FLAT LINK BAND OF WIRE COILS, WIRE COIL FOR THE PRODUCTION OF SUCH A LINK BAND AND PROCESS FOR THE PRODUCTION OF SUCH A WIRE COIL

[76] Inventor: Reinhard W. Leo, Giessener Strasse 38, 6057 Dietzenbach, Fed. Rep. of Germany

[21] Appl. No.: 629,988

[22] Filed: Jul. 11, 1984

Related U.S. Application Data

[63] Continuation-in-part of Ser. No. 328,119, Dec. 7, 1981, abandoned.

[30] Foreign Application Priority Data

Feb. 19, 1980 [DE] Fed. Rep. of Germany ....... 3047989

[51] Int. Cl.[3] .................. B21F 27/00; D02G 3/00; D03D 13/00
[52] U.S. Cl. .................................. 428/222; 245/6; 428/53; 428/221; 428/3
[58] Field of Search .............. 428/222, 224, 369, 371, 428/257, 221, 98, 53, 44; 245/6, 9; 267/59, 166

[56] References Cited

U.S. PATENT DOCUMENTS 851,288  4/1907  Hodges ................................. 245/6
4,345,730  8/1982  Leuvelink ....................... 428/98 X

FOREIGN PATENT DOCUMENTS 2419751 12/1975 Fed. Rep. of Germany ......... 245/6

Primary Examiner—Lorraine T. Kendell
Attorney, Agent, or Firm—Goodman & Teitelbaum

[57] ABSTRACT

A flat link band of wire coils, a wire coil for the production of such a link band, and the process for the production of such a wire coil, where the wire coils are fabricated from an elastic material such as plastic. Each turn of the wire coil includes a head part and a foot part, which are substantially identical to each other, being formed in each case as a reverse loop. On one side of the wire coil, each head and foot part extends over with a first shank section in a substantially straight line into a corresponding first shank section of a connecting turn. On the opposite side of the wire coil, each head and foot part extends over with a substantially straight second shank section. The second shank sections are connected together by a central winding section running substantially in the same direction as the coil axis. The winding sections substantially determine the pitch of the wire coil. Adjacent wire coils are adapted to be detachably held together with an insert wire thrust into the interengaging head and foot parts of the wire coils.

10 Claims, 4 Drawing Figures

FLAT LINK BAND OF WIRE COILS, WIRE COIL FOR THE PRODUCTION OF SUCH A LINK BAND AND PROCESS FOR THE PRODUCTION OF SUCH A WIRE COIL

RELATIONSHIP TO OTHER APPLICATIONS

This is a continuation-in-part application of copending application Ser. No. 328,119 filed Dec. 7, 1981 now abandoned for a "Flat link band of wire coils, wire coil for the production of such a link band and process for the production of such a wire coil".

BACKGROUND OF THE INVENTION

The invention relates to a flat link band of wire coils fabricated from an elastic material, for example the elastic material being plastic such as polyester or polyamide. The turn of each wire coil includes a head part and a foot part, identical or substantially identical to one another, formed in each case as a reverse loop. On the one hand, each head and foot extends over with a first shank section in a straight line or substantially in a straight line into corresponding first shank sections of, in each case the connecting turn. On the other hand, each head and foot part is connected over a second straight or substantially straight second shank section. In this arrangement, adjacent wire coils are adapted to be detachably held together with insert wires thrust into the interengaging head and foot part reverse loops.

Similar types of link bands are known in the prior art. For example, in one of these prior art types, the link bands are used, for example, as conveyor belts, sieve bands or the like. In this known link band, a plastic wire is first produced in advance to form a wire coil, preferably oval in cross section with no spacing between the adjacent coils, and is then joined with a coil of another link band that is similar but is provided with a reverse direction of rotation. In such a manner, when the wire coils are thrust into one another, they reciprocally adjust to one another by means of their diameters to provide corresponding larger spacings between the adjacent coils of each link band. Because of the recoil force of the wire coils positioned in such an engagement, there is provided a closed linkage therebetween.

The joining of these known link bands presents considerable difficulties, because the individual turns of the wire coils first have to be pushed or drawn to the right spacing therebetween, and then thrust into one another in the correct degree before the insert wire can be introduced therein. In the joined state of the wire coils, there arise tension states in the flat link band, inter alia because the wire coils have different directions of rotation. Furthermore, the wire coils of these known link bands have a tendency to curl counter to their direction of rotation, i.e., to loosen their stability in their joined state.

If the thermofixing, that is required with the known link band, is not carried out with an exact heat control, and the wire coils do not have extremely uniform dimensions, then no faultlessly flat surface structure can be produced. It has been proved already, solely by reason of the thickness tolerances of the plastic wires caused by the manufacturing technology and the fluctuations in the molecular structure, even with the most accurate possible application of heat during the wire coil production, that tensions in the link band cannot be avoided. In order nevertheless to achieve a certain standard, there is additionally required a thermofixing process, whereby the thermofixing temperature of the link band must be above the temperature of the intended later use thereof, in order to avoid any further problem with the tension differences therebetween. A further disadvantage of the known link band lies in its dependence upon the thickness of the wire used, because of which the permeability of the sieve band must find a lower limit.

SUMMARY OF THE INVENTION

An object of the present invention is to provide a link band of the type, according to the prior art category, in which the disadvantages mentioned above are avoided, i.e., in particular, a simple joining of the wire coils is achievable into a link band of high close-meshed quality.

It is a further object of the present invention to propose a wire coil for such link bands, and a process for the production of substantially tension-free wire coils.

The present invention is distinguished from a flat link band of wire coils as known in the prior art, which is fabricated from an elastic material such as a plastic material, wherein each turn of each wire coil includes a head part and a foot part so that adjacent wire coils are adapted to be detachably held together by an insert wire thrust into interengaging head and foot parts of the adjacent wire coils, the head and foot parts being substantially identical to one another with each of the head and foot parts defining a reverse loop of each turn of each wire coil, each head and foot part extending over one side of their respective wire coil with a substantially straight first shank section which extends into a corresponding straight first shank section of a connecting turn of each respective wire coil, and each head and foot part extending over the opposite side of their respective wire coil with a substantially straight second shank section.

The link band of the present invention provides an improvement over the above-mentioned prior art link band, which improvement includes the head part and its associated first and second shank sections of each turn of each wire coil being substantially disposed in a first plane substantially perpendicular to the respective longitudinally extending wire coil axis, the foot part and its associated first and second shank sections of each turn of each wire coil being substantially disposed in a second plane substantially perpendicular to the respective longitudinally extending wire coil axis, the first plane being spaced apart from and substantially parallel to the second plane, a central winding section of each turn of each wire coil connecting the second shank section of the head part to the second shank section of the foot part, the central winding section extending substantially in same direction as the respective longitudinally extending wire coil axis, and the central winding section having a predetermined axial length to substantially determine the pitch of each wire coil respectively. Furthermore, the axial length of the central winding section has a minimum length at least slightly greater than the thickness of either of the head and foot parts to avoid any longitudinal tension on the interengaging head and foot parts of the adjacent wire coils.

With the above special formation of the wire coils of the present invention, there are associated considerable advantages which will now be explained in detail. The central winding section running in or substantially in the coil axial direction provides a preset spacer for the head and foot part reverse loops, whereby there is ensured a simple joining of the wire coils. The central winding section serves further, in each case, as a stop for the foot part or head part of, in each case, the adjacent wire coil, so that the adjacent head and foot parts can be slid into one another precisely far enough so that an insert wire can be introduced therein. Finally, the central winding section prevents, too, the tendency of the wire coils to curl in an opposite direction of the rotation. By reason of this formation of the wire coils, it is possible, further, to join wire coils having the same turning direction with one another into a link band, which simplifies the production process and reduces the stock maintenance thereof. On the other hand, wire coils with left and right coil rotation can be joined alternately with one another, so that any possible tensions in the link band can be compensated for.

Accordingly, the wire coil thrust into an adjacent wire coil cannot be slid into the oppositely lying foot part or head part zone of the wire coil receiving it, but can be slid in only to about half the length of the total coil width. Thus, the clear space required to receive the insert wires can be maintained constant without any other wire coil parts hampering the insert passage. The permeability of the link band can thus, inter alia, be varied also by the thickness of the insert wire to be used. The tightest joining of the wire coils to form the link band is present when the head and foot parts lie in positions up against the winding section, which acts as a stop for the adjacent wire coils in the state of forming the link band when under pull tension. Through the establishment of the spacings of the head parts and foot parts of a wire coil, among one another, by the central winding section, these spacings are permanently adjusted and predeterminable according to the desired permeability of the grid band. Accordingly, the axial length of the respective central winding section is made, in each case, such that the head parts and foot parts having a spacing from one another so that a simple joining, at any rate an elastic snapping together of adjacent wire coils, is possible. Through the exact fittability of the wire coils into one another, there can be created a flat-lying link band which no longer requires any thermofixing at a temperature lying above the temperature of the intended use thereof.

Furthermore, through the above special formation of the wire coils of the present invention, there is avoided the formation hitherto regarded as a disadvantage, that of having relatively long and, therefore, undesirably easily bendable rest-in members. By providing the central winding section, these members are kept relatively short, so that the entire wire coil has a better stability in its construction. The wire coils remain stable in construction even in the case of an upsetting thereof, which is not the case with the known wire coils of the prior art.

With the arrangement of the present invention having equal-coverage or substantially equal-coverage of the sections with snap-in-place parts occupying only about half the width of the wire coil, on both sides transversely disposed to the coil axis, there does not arise in the joining of a plurality of such wire coils any undesired spreading between the wire coils, which otherwise as in the prior art, on slight deviations in the diameter of the wires used, would lead to undesired differing tensions therein. The parallel placement of the snap-in-place parts of the head side and foot side, in each case, with a predetermined spacing to one another, thereby permits a considerable simplification and saving in the production of the link band, without there being required any subsequent thermofixing thereof, because of the tension-free joining of the wire coils of the present invention. Such thermofixing is required in the prior art in order, as in the case of the known link band, to obviate or at least to compensate for the tensions arising on account of the recoil, and thereby to achieve an adequate structure.

Thus, a wire coil fabricated from an elastic material, for example a thermoplastic synthetic material such as polyester or polyamide, for the production of a flat link band, as was explained earlier, in which each turn includes a head part and a foot part identical or substantially identical to one another, formed in each case as a reverse loop, which, on the one hand, includes a first shank section extending over in a straight line into corresponding first shank sections of, in each case, the connecting turn and each, on the other hand, communicates over second straight or substantially straight second shank sections of the winding, and in which an insert wire is to be slidable into the head-part and foot-part forming the reverse loops, is characterized and improved according to the present invention in that the second shank sections, in projection onto the plane determining the plane of the link band of the wire coil, run substantially in coverage to the projection of the first shank sections and perpendicularly or substantially perpendicularly to the coil axis and, by extending over a central winding section or winding section running substantially in the coil axis direction, extend over into one another, which winding section solely or substantially solely according to its axial length determines the pitch of the wire coil.

The present invention relates also to a process for the production of a wire coil fabricated from an elastic material, for example a thermoplastic synthetic material such as polyester or polyamide. Preferably, the prior art wire coil, such as was explained in detail earlier, relates to a process in which the wire is drawn off from a supply coil turning about an axis of rotation lying perpendicular to the drawing-off direction and wound about a winding mandrel running in the drawing-off direction.

In this prior art production process, the wire necessarily receives a twist during the wire coil production, and thereby causes a change in the molecular structure that leads to tensions in the wire coil. This is a disadvantage, especially for the production of flat link bands, because of the impaired levelling thereof, and also for other uses of such wire coils.

According to the present invention, these above mentioned tensions in the wire coil caused by twist are avoided.

This avoided twist in the present invention is accomplished by the means that, during the winding process, the supply reel is rotated about an axis running in the drawing-off direction. This rotation occurs with a preselected rate of revolution so that the twist, otherwise occuring, is avoided. This process of the present invention has the additional advantage that profile wires can also be worked in the same manner.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

DESCRIPTION OF THE PREFERRED EMBODIMENT

Figure 1:
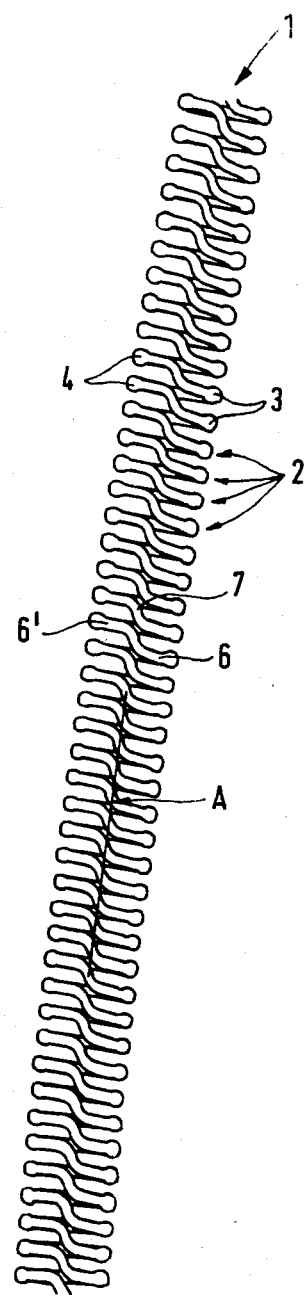
FIG. 1 shows a view of a wire coil, according to the present invention, as viewed toward the plane of the link band to be generated from such wire coils, namely from in front.
Figure 2:
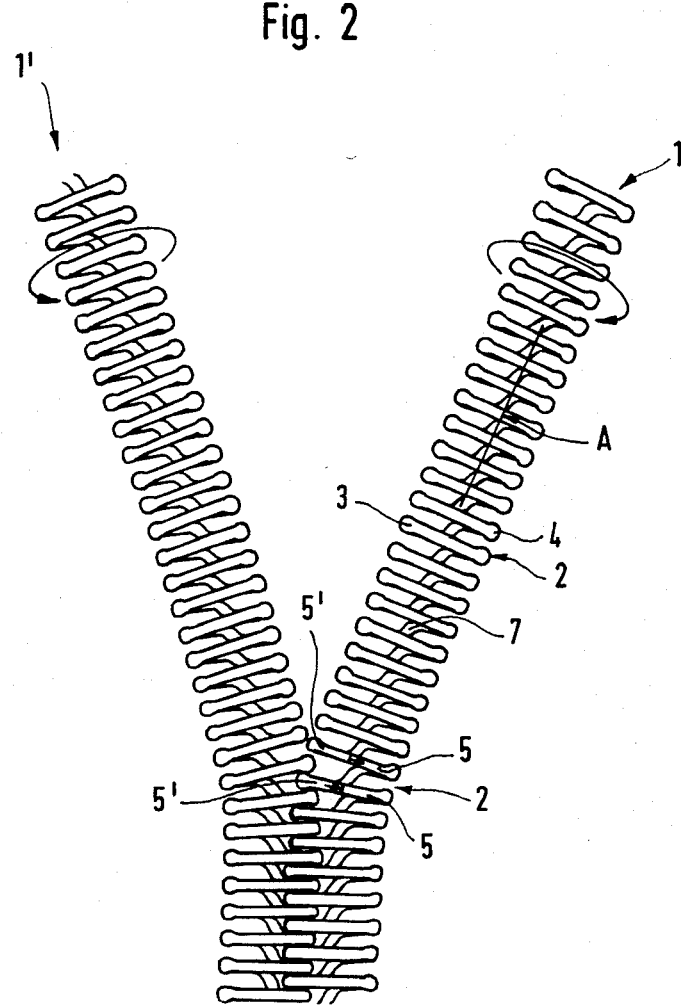
FIG. 2 shows two wire coils, similar to the wire coil shown in FIG. 1, partially joined as viewed from behind, one wire coil having a left rotation and the other wire coil having a right rotation.

The wire coil of the present invention, according to FIGS. 1 and 2, includes individual turns 2. The direction in which the turns 2 extend is indicated in FIG. 2 by small arrows. Each turn 2 has, as is best shown in FIG. 1, in each case, a head part 3 formed as a reverse loop, and a foot part 4 formed as an oppositely lying reverse loop.

As is best shown in FIG. 2, the respective foot part 4, on the one hand, extends over with a first shank section 5 in a straight line or substantially in a straight line into a corresponding first shank section 5' of, in each case, the connecting turn 2. On the other hand, as best shown in FIG. 1, there are connected to head part 3 and foot part 4, second straight or substantially straight second shank sections 6 and 6', respectively. The second shank sections 6, 6' run in projection onto the plane of the link bands substantially in coverage to the projection mentioned of the first shank sections 5' and 5, respectively and are each perpendicular or substantially perpendicular to the coil axis A. Furthermore, the second shank sections 6, 6' extend over to a central winding section 7 running in the axial direction or substantially in the axial direction so that these sections run over into one another, as shown in FIG. 1. This winding section 7, in each case, determines alone or substantially along, according to its axial length, the pitch of the wire coils 1 and 1', respectively, as shown in FIG. 2.

Thus, the head part 3 and its associated first and second shank sections 5', 6 of each turn 2 of each wire coil 1 and 1' are substantially disposed in a first plane substantially perpendicular to the respective longitudinally extending wire coil axis A. The foot part 4 and its associated first and second shank sections 5, 6' of each turn 2 of each wire coil 1 and 1' are substantially disposed in a second plane substantially perpendicular to respective longitudinally extending wire coil axis A. The first plane is spaced apart from and substantially parallel to the second plane. The central winding section 7 of each turn 2 of each wire coil 1 and 1' connect the second shank section 6 of the head part 3 to the second shank section 6' of the foot part 4. The central winding section 7 extends substantially in same direction as the respective longitudinally extending wire coil axis A, where the central winding section 7 has a predetermined axial length to substantially determine the pitch of each wire coil 1 and 1', respectively.

The flat link band of wire coils are fabricated from an elastic material, for example the elastic material is a plastic such as polyester, polyamide and the like. The head part 3 and the foot part 4 are identical or substantially identical to each other, and each forms a reverse loop adapted to be detachably held together by an insert wire thrust into the interengaging head and foot parts of adjacent wire coils. The insert wire is conventional and well known in the art, where a showing thereof is not thought necessary, particularly in view of the fact that the present invention is directed to the flat link band, the structure of the wire coil and the process for the production of the wire coil.

From the pictorial representation, it is also evident that the individual turns 2 at their reversal loops, which form the respective head part 3 and foot part 4, can be somewhat thickened or enlarged with respect to the otherwise wire thickness, so that there takes place an easy snapping in place of the adjacent wire coils 1 and 1', after which, then the corresponding insert wire can be inserted through the passage formed by the reversal loops. The central winding section 7 is dimensioned in its axial length in just such a way that these somewhat thickened reversal loops, forming the head and foot parts 3, 4, find space in the division-caused interspace of the adjacent wire coil 1, 1', without the wire coil 1, 1' being exposed to any longitudinal tension.

Figure 3:
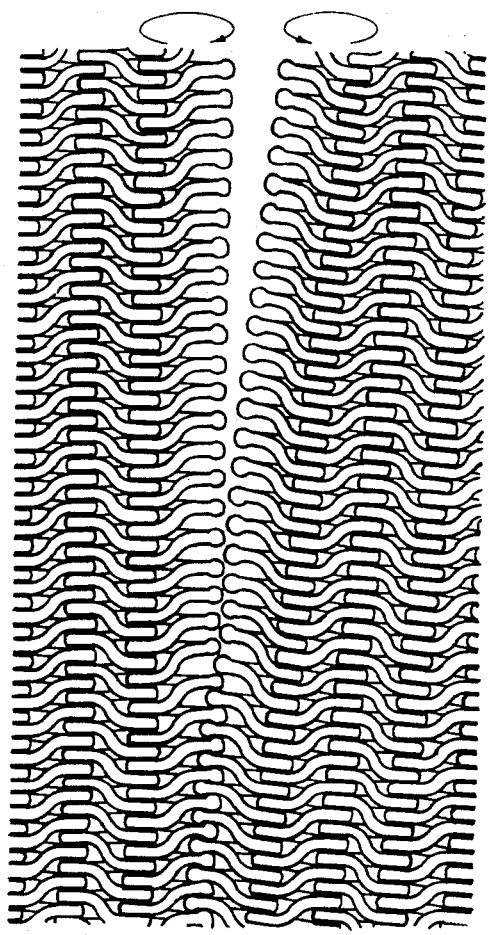
FIG. 3 shows a plan view of a link band, according to the present invention, composed of wire coils, similar to the wire coil shown in FIG. 1, which include alternately a right and a left rotation, the link band being separated in one place by the removal of an insert wire.
Figure 4:
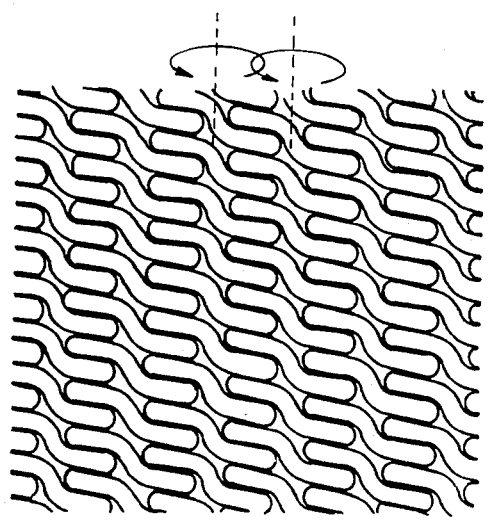
FIG. 4 shows the plan view of a link band of wire coils, similar to the wire coil shown in FIG. 1, which all have the same direction of rotation.

In the link bands represented in FIGS. 3 and 4, in each case, the front side of the wire coils 1, 1' presents, as seen in the coil axis direction, a substantially flat elongated cross section. Therefore, the side of the wire coils that present the central winding sections 7, face one and the same side of the link band. A link band is also possible in which adjacent wire coils 1, 1', have, for example, the central winding section 7 alternately on the front and on the back of the link band. In the link band of FIG. 3, the wire coils include alternately a right and a left rotation, while the link band of FIG. 4 includes wire coils having the same direction of rotation.

The present invention also relates to a process for the production of a wire coil fabricated from an elastic material, for example, a thermoplastic synthetic material such as polyester, polyamide and the like. The wire, used to form the wire coil, is drawn off from a supply reel turnable about an axis of rotation running in the drawing-off direction of the wire. It is noted, that in the prior art, as mentioned above, the axis of rotation of the supply reel is perpendicular to the drawing-off direction of the wire, which causes the wire to twist and thereby leads to tensions in the wire coil. The drawn-off wire, according to the present invention, is then wound about a winding mandrel running in the drawing-off direction of the wire to form the wire coil. The rotation of the supply reel, according to the present invention, has a preselected rate of revolution so that the twisting of the wire is avoided, unlike the wire of the prior art.

Numerous alterations of the present invention herein disclosed will suggest themselves to those skilled in the art. However, it is to be understood that the present disclosure relates to a preferred embodiment of the invention which is for purposes of illustration only and is not to be construed as a limitation of the invention.

LIST OF REFERENCE SYMBOLS 1, 1': Wire coils
2: Turns
3: Head part
4: Foot part 5, 5': First shank sections
6, 6': Second shank sections
7: Winding section

What is claimed is:

1. In a flat link band of wire coils fabricated from a plastic material, wherein each turn of each wire coil comprises a head part and a foot part so that adjacent wire coils are adapted to be detachably held together by an insert wire thrust into respective interengaging head and foot parts of adjacent wire coils, the head and foot parts being substantially identical to one another with each of the head and foot parts defining a reverse loop of each turn of each wire coil, each head and foot part extending over one side of their respective wire coil with a substantially straight first shank section which extends into a corresponding straight first shank section of a connecting turn of each respective wire coil, and each head and foot part extending over the opposite side of their respective wire coil with a substantially straight second shank section, an improvement comprising:

said head part and its associated first and second shank sections of said each turn of each wire coil being substantially disposed in a first plane substantially perpendicular to respective longitudinally extending wire coil axis;

said foot part and its associated first and second shank sections of said each turn of each wire coil being substantially disposed in a second plane substantially perpendicular to said respective longitudinally extending wire coil axis;

said first plane being spaced apart from and substantially parallel to said second plane;

a central winding section of said each turn of each wire coil connecting said second shank section of said head part to said second shank section of said foot part, said central winding section extending substantially in the same direction as said respective longitudinally extending wire coil axis, and said central winding section having a predetermined axial length which substantially determines the pitch of each wire coil respectively; and said axial length of said central winding section having a minimum length at least slightly greater than the thickness of either of said head and foot parts thereby avoiding any longitudinal tension on said respective interengaging head and foot parts of said adjacent wire coils.

2. In a flat link band according to claim 1, wherein said plastic material is polyester or polyamide.

3. In a flat link band according to claim 1, wherein said central winding section provides stop means which limits the amount of insertion of said respectively interengaging head and foot parts of said adjacent wire coils.

4. In a flat link band according to claim 1, wherein said head and foot parts are enlarged with respect to said first, second and central winding sections to provide a snapping in arrangement for said respective interengaging head and foot parts of said adjacent wire coils.

5. In a flat link band according to claim 1, wherein said adjacent wire coils have the same direction of rotation.

6. In a flat link band according to claim 1, wherein said adjacent wire coils have opposite directions of rotation.

7. In a wire coil fabricated from a plastic material, wherein each turn of the wire coil includes a head part and a foot part so that two adjacent wire coils are adapted to be detachably held together by an insert wire thrust into respective interengaging head and foot parts of the two adjacent wire coils for production of a flat link band, the head and foot parts being substantially identical to one another with each of the head and foot parts defining a reverse loop of each turn of the wire coil, each head and foot part extending over one side of the wire coil with a substantially straight first shank section which extends into a corresponding straight first shank section of a connecting turn of the wire coil, and each head and foot part extending over the opposite side of the wire coil with a substantially straight second shank section, an improvement comprising:

said head part and its associated first and second shank sections of said each turn of said wire coil being substantially disposed in a first plane substantially perpendicular to longitudinally extending wire coil axis;

said foot part and its associated first and second shank sections of said each turn of said wire coil being substantially disposed in a second plane substantially perpendicular to said longitudinally extending wire coil axis;

said first plane being spaced apart from and substantially parallel to said second plane;

a central winding section of said each turn of said wire coil connecting said second shank section of said head part to said second shank section of said foot part, said central winding section extending substantially in the same direction as said longitudinally extending wire coil axis, and said central winding section having a predetermined axial length which substantially determines the pitch of said wire coil; and said axial length of said central winding section having a minimum length at least slightly greater than the thickness of either of said head and foot parts, whereby said minimum length of said central winding section avoids any longitudinal tension on the respective interengaging head and foot parts of the two adjacent wire coils.

8. In a wire coil according to claim 7, wherein said plastic material is polyester or polyamide.

9. In a wire coil according to claim 7, wherein said central winding section provides stop means which limits the amount of insertion of the respective interengaging head and foot parts of the two adjacent wire coils.

10. In a wire coil according to claim 7, wherein said head and foot parts are enlarged with respect to said first, second and central winding sections to provide a snapping in arrangement for the respective interengaging head and foot parts of the two adjacent wire coils.

* * * * *